United States Patent [19]

Baker et al.

[11] Patent Number: 4,807,106
[45] Date of Patent: Feb. 21, 1989

[54] METHOD AND CIRCUIT FOR VOLTAGE REGULATION OF DC POWER SOURCES

[75] Inventors: Donal E. Baker, American Twp., Allen County; David A. Fox, Shawnee Twp., Allen County; Roger D. Thornton, St. Marys, all of Ohio

[73] Assignee: Westinghouse Electric Corp., Pittsburgh, Pa.

[21] Appl. No.: 193,870

[22] Filed: May 12, 1988

[51] Int. Cl.$^4$ ............................................. H02P 9/00
[52] U.S. Cl. ..................................... 363/84; 363/126; 322/25; 322/59
[58] Field of Search ....................... 363/84, 85, 86, 87, 363/88, 125, 126; 322/23, 24, 25, 28, 59

[56] References Cited

U.S. PATENT DOCUMENTS

| | | | |
|---|---|---|---|
| 3,668,514 | 6/1972 | Peck | 363/85 |
| 3,996,507 | 12/1976 | Chambers | 322/59 |
| 4,030,017 | 6/1977 | Brown | 363/126 |
| 4,622,629 | 11/1986 | Glennon | 363/126 |
| 4,658,200 | 4/1987 | Kouge | 322/59 |

Primary Examiner—Peter S. Wong
Attorney, Agent, or Firm—R. P. Lenart

[57] ABSTRACT

Voltage regulation of a DC electrical power source having a generator with an exciter field coil for producing an AC output voltage which is rectified to produce a DC output voltage, is accomplished by producing voltage signals proportional to the AC output voltage of the generator and the current in the generator exciter field winding, and combining these signals to produce a control signal. An additional voltage signal proportional to the DC output voltage of the power source is compared to a DC reference voltage signal to produce a trim error voltage signal. The trim error voltage signal is combined with an AC reference signal to produce an additional control signal. These control signals are compared and the result of that comparison is used to control the current in the generator exciter field winding.

5 Claims, 3 Drawing Sheets

METHOD AND CIRCUIT FOR VOLTAGE REGULATION OF DC POWER SOURCES

BACKGROUND OF THE INVENTION

This invention relates to regulation of the output voltage of electrical power sources and, more particularly to the regulation of DC electrical power sources which include a generator having an exciter field coil with the output of the generator being proportional to current in the exciter field coil.

DC electrical power systems offer several advantages over AC systems in aerospace applications. For example, DC systems eliminate reactive voltage drops in feeder lines at high power levels and are compatible with electromechanical actuators. Also, DC power may be developed by a wide speed range generator and simple rectifier thereby eliminating the constant speed drive or converter required for constant frequency AC systems. Furthermore, off line power conversion components and circuits can operate directly from relatively high voltage DC with very high frequency converters replacing 400 hertz transformers and rectifiers. A typical 270 volts DC aircraft generating system includes a wide speed range generator having a multiple phase AC output which is rectified by a full wave bridge rectifier and filtered by a capacitor to produce the DC output. A voltage regulator senses the DC output voltage and controls the excitation of the generator to maintain the output voltage.

In such systems, the time constant of the output filter capacitor and load resistance can vary over several orders of magnitude as the load is changed. At the extreme case of no load, the output capacitor has no discharge path at all. A load removal transient on the system will naturally cause an overshoot in the output voltage. The overshoot voltage becomes trapped on the filter capacitor which holds the output high for a time dependent only on leakage currents. If the regulator senses DC output voltage and the bridge rectifier is not conducting, the regulation control loop is broken. Under those conditions, the voltage regulator senses the high output voltage and reduces the generator excitation to zero, attempting to reduce the overshoot. In effect, the generator goes to sleep. The generator AC output will not start to increase until the DC output falls below the regulation set point. At this time, the regulator begins to increase excitation to the generator. Excitation current can only increase at a rate limited by the forcing voltage and inductance of the exciter field winding. As generator output increases, it will overshoot the regulation point again and a limit cycle may result.

If the load is suddenly reapplied while the generator is asleep, the only source of power will be the output filter capacitor. The output voltage will be severely depressed until the generator output increases.

Compromises may be made in the system performance to improve voltage stability. Time constants in the regulator may be chosen to eliminate the limit cycle but only at the expense of good load transient response. Even a very slow responding system will still have the sleeping generator problem at no load. A bleeder resister may be added across the DC output to bring the output voltage down more quickly, but at the expense of efficiency. The required bleeder current may be several percent of the rated output current. A bleeder current of 2% will cause a 2% loss in efficiency, more than doubling the losses in the rectifier.

It is therefore desirable to regulate DC voltage systems in a manner which limits output voltage transients resulting from the operating scenario described above.

SUMMARY OF THE INVENTION

This invention provides a method for regulating a DC electrical power source having a generator, with an exciter field coil, that produces an AC output voltage which is rectified to produce a DC output voltage. The method includes the steps of: producing a first signal proportional to the AC output voltage of the generator; sensing the current in the exciter field winding of the generator; producing a second signal proportional to the exciter field current; and combining the first and second signals to produce a third signal. A fourth signal proportional to the DC output voltage of the power source is compared to a DC reference signal to produce a trim error signal. The trim error signal is combined with an AC reference signal to produce a fifth signal. The third and fifth signals are compared to produce a sixth signal and the current in the exciter field winding is controlled in response to this sixth signal. In the preferred embodiment, the various signals are voltage signals.

This invention also encompasses a circuit which performs the above voltage regulation method. By providing redundant voltage sensing and control loops, this invention is capable of limiting a resulting overvoltage condition to tolerable voltages in the event of a loss of the DC sensing conductors.

DESCRIPTION OF THE PREFERRED EMBODIMENT

Figure 1:
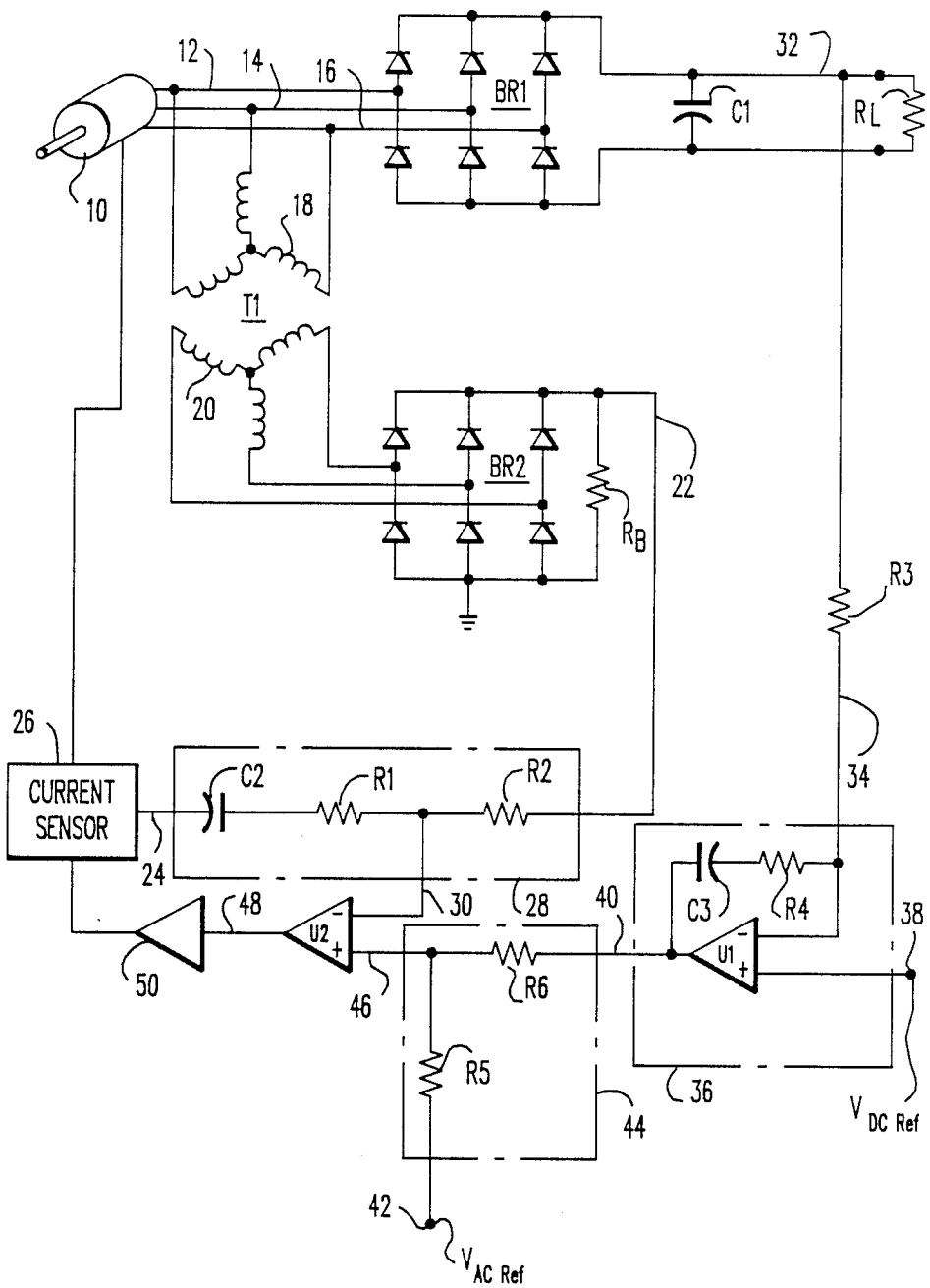
FIG. 1 is a simplified schematic diagram of a DC power system having a voltage regulator constructed in accordance with one embodiment of the present invention.

Referring to the drawings, FIG. 1 is a schematic diagram of a DC electrical power system having a voltage regulator constructed in accordance with one embodiment of the present invention. Generator 10 is a wide speed range generator, such as typically found on aircraft, and produces a three-phase AC output voltage on conductors 12, 14 and 16. This AC voltage is rectified by full wave bridge rectifier BR1 and filtered by capacitor C1 to produce a DC output voltage for a load indicated by resistor $R_L$. A WYE-WYE connected sensing transformer T1 includes a multiple phase primary winding 18 connected to the three-phase output of the generator and a secondary winding 20 connected to a full wave bridge rectifier BR2 to produce a first voltage signal proportional to the AC output voltage of the generator on line 22. If bridge BR1 is conducting, the voltage signal on line 22 will be proportional to the DC output. If bridge BR1 is not conducting, due to an output voltage overshoot, the voltage signal on line 22 will follow the generator output. The WYE-WYE winding configuration of transformer T1 ensures that the first voltage signal will track a DC output for any wave shape or distortion in the output of the generator. In other words, the first voltage signal developed by bridge BR2 will match the output of bridge BR1 whenever bridge BR1 is conducting. A second, or feedback, voltage signal proportional to the exciter field current is produced on line 24 by current sensor 26. A divider circuit 28 comprising capacitor C2 and resistors R1 and R2 is used to combine the first and second voltage signals on lines 22 and 24 to produce a third voltage signal on line 30. Because there is no filter capacitor on the output of bridge BR2, the first voltage signal on line 22 always follows the generator output voltage. The control loop is not broken when bridge BR1 stops conducting. Transient response of the AC control loop can be optimized without regard for the output filter discharge time constant at light loads. Because the DC output voltage across capacitor C1 is filtered and the first voltage signal on line 22 is not filtered, tracking between the two will vary as the DC output is loaded. For example, at very light loads, the DC output will ride up to the peak of the generator AC output. At heavy loads, the DC output will be about 5% lower.

To maintain good DC regulation, a second control loop is added. Resister R3 is connected to sense the DC output voltage on line 32 to produce a fourth voltage control signal, which is proportional to the DC output voltage of the power source, on line 34. A comparator circuit 36 including operational amplifier U1, resistor R4 and capacitor C3, compares the fourth voltage signal on line 34 to a first, or DC, reference voltage signal supplied on terminal 38. This produces a trim error voltage signal on line 40. The trim error signal is proportional to the error plus the integral of the error signal which is used to trim a second, or AC, reference voltage signal supplied on terminal 42. In the preferred embodiment of this invention, both the DC and AC reference voltage signals are actually DC signals with the magnitudes being proportional to desired levels of DC and AC voltage respectively. This trimming is accomplished by supplying the trim error voltage signal and AC reference voltage signal to opposite ends of a voltage divider 44 which comprises resistors R5 and R6. By using voltage divider 44 to combine the trim error voltage signal and AC reference voltage signals, a fifth voltage signal is produced on line 46.

Comparator U2 compares the third voltage signal on line 30 with the fifth voltage signal on line 46 to produce a pulse width modulated sixth voltage signal on line 48. Power amplifier 50 then controls the current in the generator exciter field winding in response to this sixth voltage signal.

The circuit functions performed by elements 26, 28, U2 and 50 are disclosed in U.S. Pat. No. 4,446,417, issued May 1, 1984 to Fox et al.

In the preferred embodiment, the trim error signal trims the fourth voltage control signal to match the DC reference exactly, despite loading of the system. This is due to the integrating nature of the error amplifier and capacitor C3. The integrator thus provides infinite loop gain for the trim loop, and the final steady state voltage on line 32 will match the DC reference for all loads.

The range of the trim error voltage signal is limited to compensate only for loading and temperature effects. This range is limited by the saturation of operational amplifier U1 and the choice of values for resistors R5 and R6. As a result, the generator output is maintained close to the proper voltage, even when a load removal transient has produced an over voltage output. If the trim range is limited to, for example, 10%, then the generator output will be maintained at 90% of the proper output voltage until capacitor C1 discharges and bridge BR1 begins to conduct. Load applications will be supported by the generator waiting at 90% voltage. Thus the problem of the sleeping generator is reduced considerably.

Figure 2:
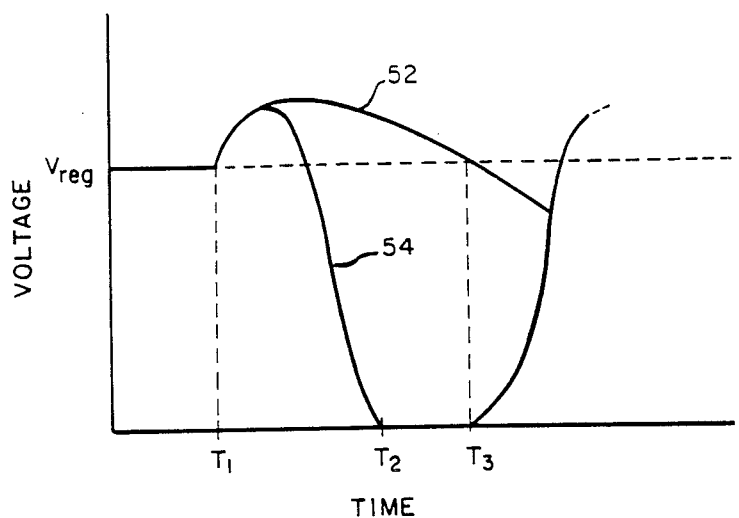
FIGS. 2 and 3 show waveforms which illustrate the operation of prior art voltage regulators as described above.
Figure 3:
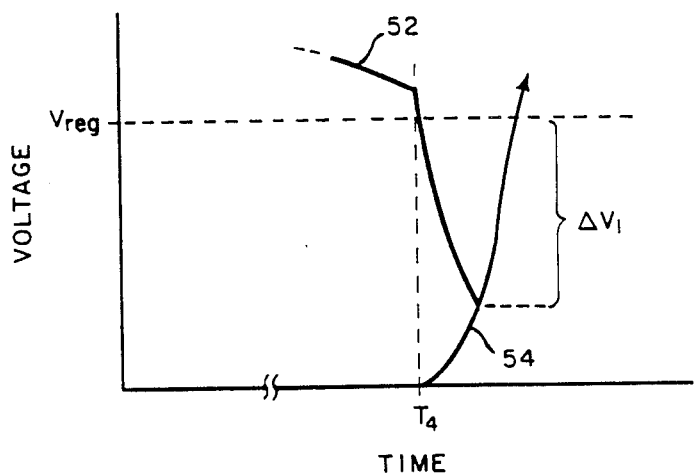

The response time of the DC trim loop is set so as to not interfere with the AC loop. This is done by making its response somewhat slower than that of the AC loop. The operation of the new system and its associated benefits can be seen by reference to FIGS. 2–5. FIGS. 2 and 3 illustrate the operation of prior art voltage regulation schemes wherein regulation is responsive to the DC output voltage of the power source. Curve 52 represents the DC output voltage of the system and curve 54 represents the AC output voltage of the generator. In FIG. 2, the system is operating under stable conditions at the regulated output voltage, $V_{reg}$ when at time $T_1$ the load is suddenly removed and the output voltage and generator voltage begin to overshoot the regulated values. Since the regulation control loop is broken, the regulator senses the high output voltage and reduces the generator excitation to zero, attempting to reduce the overshoot. Therefore, between times $T_2$ and $T_3$ the generator is effectively asleep and its output is zero. Once the DC output voltage of the system falls below the regulated setpoint at time $T_3$, the regulator begins to increase generator excitation and the generator output voltage increases. As the generator output voltage increases, it will overshoot the regulation point again and a limit cycle may result. FIG. 3 illustrates the operation of the same prior art voltage regulation technique when the load is suddenly reapplied while the generator is asleep. This occurs at time $T_4$ and the only source of output power is the output filter capacitor. This results in the output voltage being severely depressed by an amount $\Delta V_1$ while the generator output is increasing.

Figure 4:
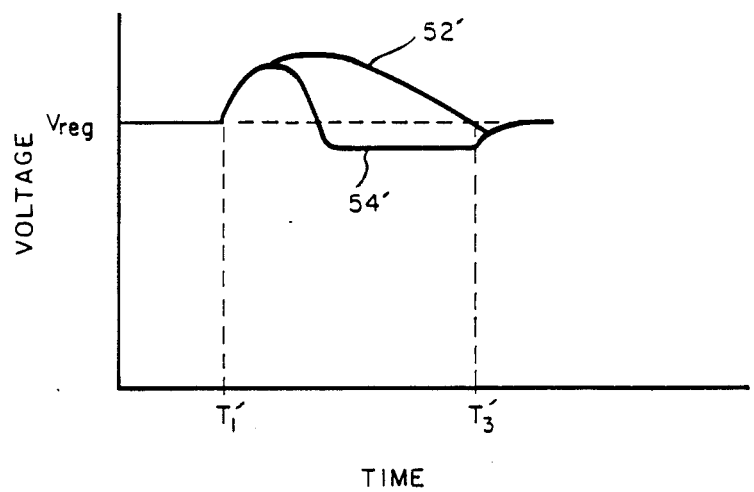
FIGS. 4 and 5 are waveforms which illustrate the operation of the present invention.
Figure 5:
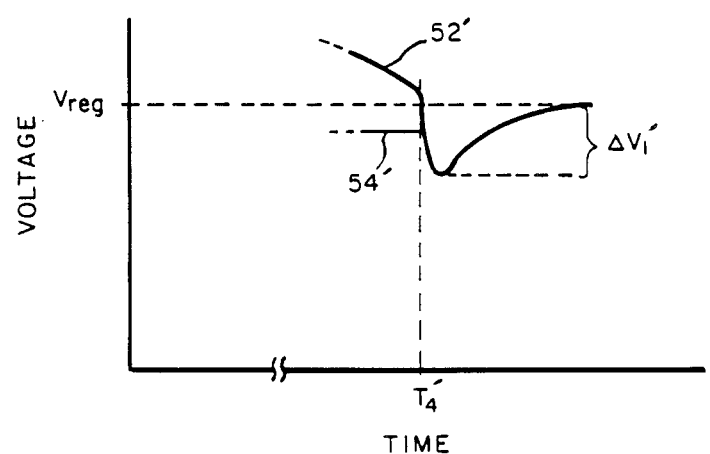

FIGS. 4 and 5 illustrate the operation of the present invention. In these figures, curve 52' represents the DC output voltage and curve 54' represents the generator AC output voltage. FIG. 4 illustrates the performance of the system when the load is suddenly removed at time $T_1'$. Once again, the DC output voltage and AC output voltages overshoot. However, the present invention prevents the AC output voltage of the generator from falling below about 90% of its normal magnitude. Therefore, when the DC output voltage falls below the regulation setpoint at time $T_3'$, the voltage transient created when the generator output again increases to its normal value is considerably reduced. FIG. 5 illustrates the operation of this invention when the load is suddenly reapplied at time $T_4'$ following a temporarily output voltage overshoot. In this case, the transient voltage $\Delta V_1'$ is seen to be significantly smaller than the transient voltage $\Delta V_1$ in FIG. 3.

An added benefit of the present invention results from the use of redundant sensing. Single control loop regulators will force the generator to ceiling voltage if sensing is lost. For wide speed range generators, ceiling voltage may be several times rated voltage. With this invention, the loss of the DC sensing leads, which may be remote in typical applications, will result in only a 10% over voltage correction.

Although the present invention has been described in terms of what is at present believed to be its preferred embodiment, it will be apparent to those skilled in the art that various changes may be made without departing from the scope of the invention. It is therefore intended that the appended claims cover such changes.

We claim:

1. A voltage regulator circuit for a DC electrical power source including a generator having an exciter field winding, and means for rectifying an AC output voltage of said generator to produce a DC output voltage, said circuit comprising:
    means for producing a first signal proportional to the AC output voltage of said generator;
    means for sensing current in said exciter field winding of said generator and for producing a second signal proportional to said exciter field current;
    means for combining said first and second signals to produce a third signal;
    means for producing a fourth signal proportional to the DC output voltage of said power source;
    means for comparing said fourth signal to a DC reference signal to produce a trim error signal;
    means for combining said trim error signal with an AC reference signal to produce a fifth signal;
    means for comparing said third signal with said fifth signal to produce a sixth signal; and
    means for controlling current in said exciter field winding in response to said sixth signal.

2. A voltage regulator circuit as recited in claim 1, wherein said means for comparing said fourth signal to said DC reference signal to produce said trim error signal comprises:
    an integrator having a first input for receiving a said fourth signal, and a second input for receiving said DC reference signal, wherein said trim error signal is produced on an output of said integrator.

3. A voltage regulator as recited in claim 1, wherein said means for producing said first signal comprises:
    a three phase wye-wye transformer having a primary winding connected to a three phase output of said generator and a secondary winding; and
    a three phase rectifier bridge circuit connected to said secondary winding to rectify an output voltage of said secondary winding, thereby producing said first signal.

4. A voltage regulator as recited in claim 1, wherein said means for combining said trim error signal and said AC reference signal comprises:
    two resistors electrically connected in series with each, one of said resistors being connected to receive said trim error signal and the other one of said resistors being connected to receive said AC reference signal, such that said fifth signal is produced at a junction point between said resistors.

5. A method for regulating a DC electrical power source including a generator having an exciter field winding, and means for rectifying an AC output voltage of said generator to produce a DC output voltage, said method comprising the steps of:
    producing a first signal proportional to the AC output voltage of said generator;
    sensing current in said exciter field winding of said generator and producing a second signal proportional to said exciter field current;
    combining said first and second signals to produce a third signal;
    producing a fourth signal proportional to the DC output voltage of said power source;
    comparing said fourth signal to a DC reference signal to produce a trim error signal;
    combining said trim error signal with an AC reference signal to produce a fifth signal;
    comparing said third signal with said fifth signal to produce a sixth signal; and
    controlling current in said exciter field winding in response to said sixth signal.

* * * * *